US000001306H

United States Statutory Invention Registration [19]

[11] Reg. Number: H1306

Drach

[43] Published: May 3, 1994

[54] METHOD OF USING AN IMPROVED SOLDER TO BRIDGE A NONMETALLIC GAP BETWEEN METALLIC SURFACES, SAID IMPROVED SOLDER, AND AN IMPROVED SOLDER CONNECTION TO BRIDGE A NONMETALLIC GAP BETWEEN METALLIC SURFACES

[75] Inventor: William C. Drach, Trenton, N.J.

[73] Assignee: The United States of America as represented by the Secretary of the Army, Washington, D.C.

[21] Appl. No.: 6,573

[22] Filed: Jan. 21, 1993

[51] Int. Cl.[5] ..... B23K 35/22; B23K 35/36

[52] U.S. Cl. ..... 228/262.2; 228/56.3; 228/179.1; 228/189; 228/248.5; 428/608; 428/614; 29/846; 403/271

[58] Field of Search ..... 228/245, 248, 119, 179, 228/263.12, 19, 35, 56.3; 428/408, 608, 614

[56] References Cited

U.S. PATENT DOCUMENTS

| | | | |
|---|---|---|---|
| 3,676,916 | 7/1972 | Schierding et al. | 428/611 |
| 3,973,718 | 8/1976 | Deschamps | 228/248 |
| 4,323,631 | 4/1982 | Spirig | 228/19 |
| 4,572,271 | 2/1986 | Nakashima et al. | 228/190 |
| 5,088,007 | 2/1991 | Missele | 428/614 |
| 5,089,356 | 2/1992 | Chung | 428/608 |

FOREIGN PATENT DOCUMENTS

| | | | |
|---|---|---|---|
| 3259063 | 10/1988 | Japan | 228/248 |

*Primary Examiner*—Samuel M. Heinrich
*Assistant Examiner*—Anthony R. Chi
*Attorney, Agent, or Firm*—Michael Zelenka; Roy E. Gordon

[57] ABSTRACT

An improved solder is provided by imbedding solder with metallized fibers. The improved solder is then used to bridge a nonmetallic gap between two separated metallic surfaces by placing the improved solder on the gap and then applying heat to cause the improved solder to melt and flow and bridge the gap and connect the two separated metallic surfaces.

24 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF USING AN IMPROVED SOLDER TO BRIDGE A NONMETALLIC GAP BETWEEN METALLIC SURFACES, SAID IMPROVED SOLDER, AND AN IMPROVED SOLDER CONNECTION TO BRIDGE A NONMETALLIC GAP BETWEEN METALLIC SURFACES

GOVERNMENT INTEREST

The invention described herein may be manufactured, used, and licensed by or for the Government for governmental purposes without the payment to me of any royalties thereon.

FIELD OF INVENTION

The invention relates in general to an improved solder and to a method of using the improved solder to bridge a non-metallic gap between metallic surfaces and in particular to a solder imbedded with metallic fibers and to a method of using the solder imbedded with the metallic fibers to bridge the nonmetallic gap and connect the two separated metallic surfaces.

BACKGROUND OF THE INVENTION

Currently, electrical solder connections are made with a lead/tin or other metal alloy. Problems exist with this method. That is, solder will only adhere to metallized surfaces as for example, copper. Moreover, solder exhibits cohesion effects that tend to make the solder form into globs. Then too, solder is typically "soft" (that is, malleable). The first two effects make it difficult to bridge nonmetallic gaps greater than 0.1 millimeter between metallic surfaces. The third effect makes the connection weak or of low tensile and shear strength.

SUMMARY OF THE INVENTION

The general object of this invention is to provide an improved solder that can bridge a nonmetallic gap between metallic surfaces or electronic components that ordinarily cannot be bridged with conventional solder. Another object of the invention is to add structural strength to electronic component solder connections. A still further object of the invention is to provide an improved solder that can bridge the non metallic gaps between metallic surfaces such as circuit ground planes and circuit board traces, and that can join electronic components to circuit boards where a non metallic gap may exist originating from misshaped, positional or placed components.

It has now been found that the aforementioned objects can be attained by providing an improved solder wherein a conventional solder such as an alloy of 60 percent lead and 40 percent tin is embedded or reinforced with metallized fibers. The improved solder is then used to bridge the non metallic gap between two separated metallic surfaces by placing the improved solder on the gap and then applying heat to cause the improved solder to melt and flow and bridge the gap and connect the two separated metallic surfaces.

The fiber composition can be varied from solid metallic fibers to metallized nonmetallic fibers. The fibers can be varied in width from 0.01 millimeter to 1 millimeter, and in length from 1 mm to 50 mm. The cross sectioning shape of the fiber can be circular, triangular, or ribbon like. Fiber orientation can be either random or aligned along a preferred axis. The percentage of metallic fiber to solder can range from about 1 to about 50 percent by volume. The improved solder can be manufactured in many forms. It can be configured into a wire, bar, or paste.

The improved solder is made as is conventional solder with the addition of the metallized fibers before the solder is drawn into final form.

Then, when a nonmetallic gap exists in between two metallic surfaces and an electrically conductive connection must be made, the improved solder is used in place of conventional solder. When the solder melts across the two metallic surfaces, the fibers bridge the nonmetallic gap and form an electrical connection. This connection is also stronger than the connection of conventional solder.

The improved solder can be used to bridge nonmetallic gaps in metallized, as for example, copper surfaces in electronic circuit tracers and components. The improved solder also adds strength to previously soft and weak solder connections.

The essence of the invention lies in the addition of non melting metallized filaments to conventional solders and the use of the resultant improved solder to bridge gaps wider than possible with conventional solder.

DESCRIPTION OF THE PREFERRED EMBODIMENT

A conventional solder, as for example, an alloy of 60 weight percent lead and 40 weight percent tin is imbedded with steel fibers having a diameter of 3 mils and $\frac{1}{4}''$ in length before the solder is drawn into final form. Fifteen to 20 volume percent of the improved solder is made up of fibers and seventy five to 60 volume percent of the improved solder is lead-tin alloy.

The improved solder is then used to bridge a nonmetallic gap from 0 to $\frac{1}{8}$ inch in width between two copper clad circuit boards.

DESCRIPTION OF THE DRAWING

Referring to FIG. 1, metallized surfaces 10, 12, are separated by a nonmetallic gap 14. Conventional solder 16, and 18 is placed across the metallized surfaces 10, and 12 and heat is applied to melt the solder, 16 and 18. When the solder melts, it tends to glob into two separate balls because of cohesive forces and the gap, 14 between the two metallized surfaces 10, and 12 remains. Only when the diameter of the glob becomes as large as the gap, 14 will it bridge the gap. This requires an excessive amount of solder.

Referring to FIG. 2, the two metallized surfaces 10, and 12 have a nonmetallic gap, 14 between them. Improved solder, 20 is placed on the gap, 14. Heat is applied and the improved solder, 20 flows. As the non melting metallic fibers in the improved solder, 20 have a higher melting point than the solder, metallic fibers bridge the gap, 14 and the improved solder, 20 connects the two separated metallic surfaces, 10 and 12. The metallic fibers provide metal surfaces that satisfy the cohesive forces of the improved solder, 20 and provide ample locations for the improved solder to flow or "wet." The cohesive forces of the improved solder stretch out the fibers across the gap to yield a planar bridge gap; that is, the gap below the metal does not fill with solder.

Referring to FIG. 3, the improved solder, 20 includes solder imbedded with metallic as, for example gold, silver, or copper fibers. These fibers can be composed of any metallic material that the solder will stick to, and the metallic fibers can be of varying diameter and length to suit the application. For example, the length of the fiber can be varied depending on the width of the gap being traversed. The fibers can be randomly oriented or given a preferred orientation. The solder composition can also be varied using combinations of lead, tin, silver, indium, etc. Flux can also be added to the solder core to help flow the solder onto the metallic surfaces.

Figure 1:
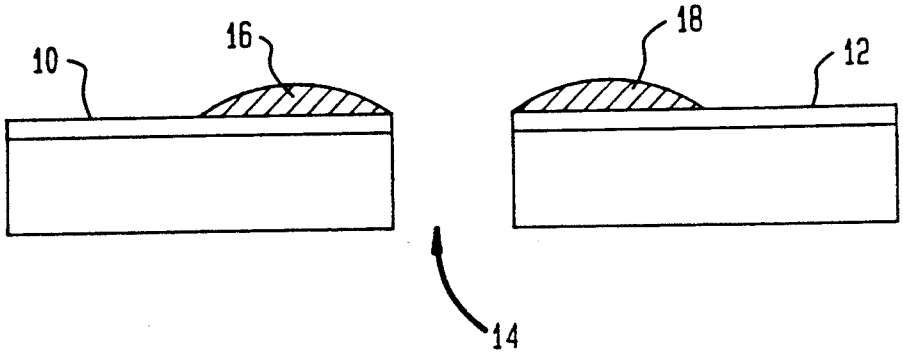
FIG. 1 shows an attempt at soldering a gap with conventional solder.
Figure 2:
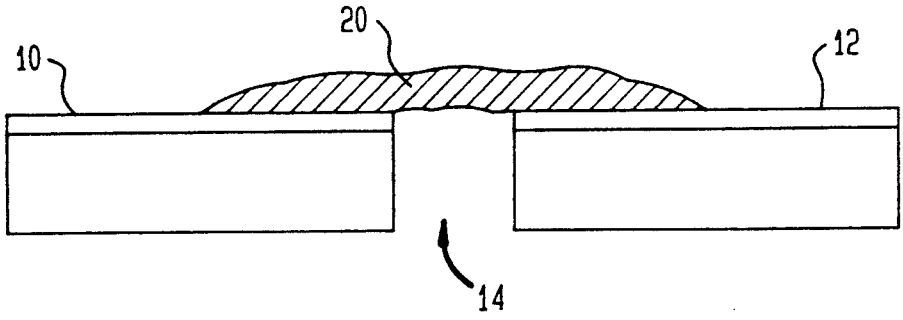
FIG. 2 shows the same gap as in FIG. 1 except that the gap is bridged with the improved solder.
Figure 3:
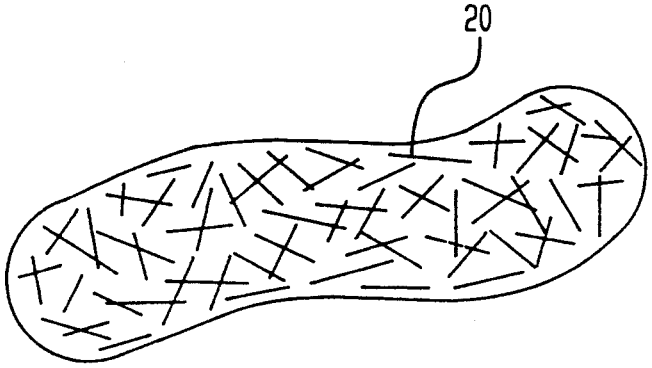
FIG. 3 shows the improved solder.

I wish it to be understood that I do not desire to be limited to the exact details of construction shown and described for obvious modifications will occur to a person skilled in the art.

What is claimed is:

1. An improved solder comprising solder imbedded with metallic fibers.

2. An improved solder according to claim 1 wherein the metallic fibers are solid metallic fibers.

3. An improved solder according to claim 1 wherein the metallic fibers are metallized nonmetallic fibers.

4. An improved solder according to claim 1 wherein the fiber is composed of any metallic material that the solder will stick to.

5. An improved solder according to claim 4 wherein the fiber is of varying widths and shapes.

6. An improved solder according to claim 4 wherein the fibers are randomly oriented.

7. An improved solder according to claim 4 wherein the fibers are aligned along a preferred axis.

8. An improved solder according to claim 4 wherein the percent of metallic fibers to solder can range from about 1 to about 50 percent by volume.

9. Method of bridging nonmetallic gaps between two separated metallic surfaces using an improved solder comprising solder imbedded with metallized fibers, said method comprising placing the improved solder on the gap and then applying heat causing the improved solder to melt and flow and bridge the gap and connect the two separated metallic surfaces.

10. Method according to claim 9 wherein the metallized fibers are solid metallic fibers.

11. Method according to claim 9 wherein the metallized fibers are metallized nonmetallic fibers.

12. Method according to claim 9 wherein the fiber is composed of any metallized material that the solder will stick to.

13. Method according to claim 12 wherein the fiber is of varying widths and shapes.

14. Method according to claim 12 wherein the fibers are randomly oriented.

15. Method according to claim 12 wherein the fibers are aligned along a preferred axis.

16. Method according to claim 12 wherein the percent of metallized fiber to solder can range from about 1 to about 50 percent by volume.

17. An improved solder connection that bridges nonmetallic gaps between metallic surfaces, said improved solder connection comprising solder imbedded with metallized fibers.

18. An improved solder connection according to claim 17 wherein the metallized fibers are solid metallic fibers.

19. An improved solder connection according to claim 17 wherein the metallized fibers are metallized nonmetallic fibers.

20. An improved solder connection according to claim 17 wherein the fiber is composed of any metallized material that the solder will stick to.

21. An improved solder connection according to claim 20 wherein the fiber is of varying width and shapes.

22. An improved solder connection according to claim 20 wherein the fibers are randomly oriented.

23. An improved solder connection according to claim 20 wherein the fibers are aligned along a preferred axis.

24. An improved solder connection according to claim 20 wherein the percent of metallized fiber can range from about 1 to about 50 percent by volume.

* * * * *